Dec. 1, 1925.

W. FRIEDHOFF 1,563,560

MEANS FOR FILLING GASOLINE TANKS

Original Filed April 23, 1924

Inventor
William Friedhoff
By Rudolph M. Lotz
Attorney

Patented Dec. 1, 1925.

1,563,560

UNITED STATES PATENT OFFICE.

WILLIAM FRIEDHOFF, OF CHICAGO, ILLINOIS.

MEANS FOR FILLING GASOLINE TANKS.

Continuation of application Serial No. 708,387, filed April 23, 1924. This application filed August 20, 1924. Serial No. 733,227.

*To all whom it may concern:*

Be it known that I, WILLIAM FRIEDHOFF, a subject of Germany, and a resident of Chicago, Cook County, Illinois, have invented certain new and useful Improvements in and for Means for Filling Gasoline Tanks, of which the following is a specification.

This invention has for its object to provide means for easily and conveniently filling with gasoline, the tanks of automotive vehicles which are disposed under the seat and, therefore, necessitate that the occupants rise therefrom in order to permit the cushion to be removed for access to the filler plug, it being a further object of the invention to provide a filling device of the kind specified which may be easily and quickly installed by unskilled persons and which includes a gauge and dial, the latter disposed for easy reading by the driver.

The foregoing objects comprehend also the embodiment of said means in the form of a complete attachment assembled at the factory ready for the purchaser's use and which is designed for economic manufacture and efficient operation.

Figure 1:
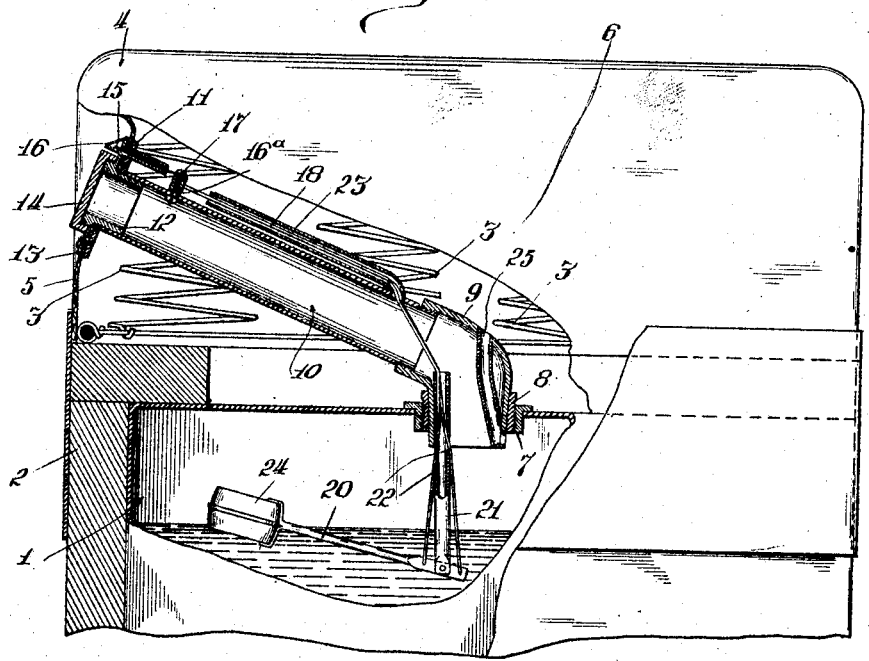

In the accompanying drawings illustrating a suitable embodiment of the invention, Fig. 1 is a fragmentary sectional view of the seat, tank and cushion of an automotive vehicle, the tank and cushion being equipped with a filling device constructed in accordance with the invention and shown in central vertical, longitudinal section.

Figure 2:
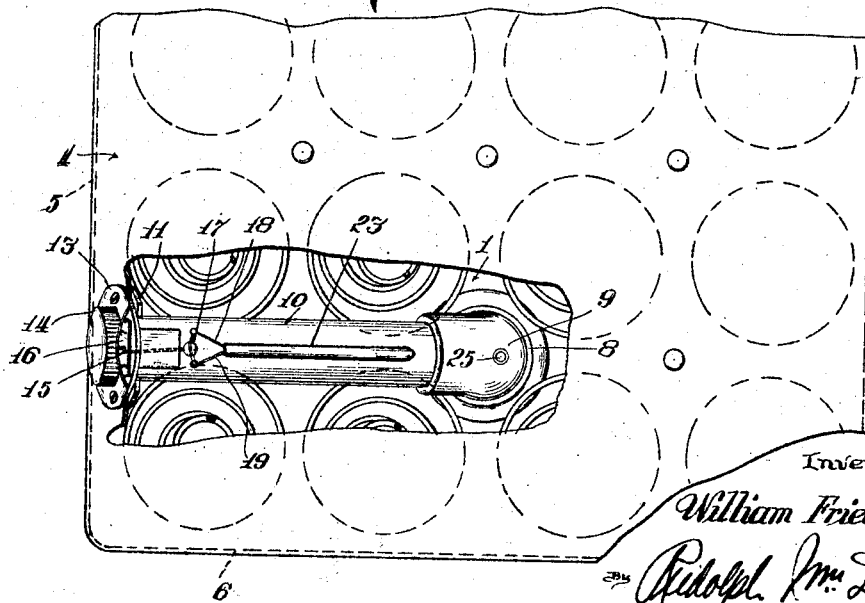

Fig. 2 is fragmentary top plan view of the cushion partly broken away to show, in plan, the said attachment.

The present application relates to subject-matter in some respects similar to that of my previous (now abandoned) application for patent, filed April 23, 1924, Serial No. 708,-387.

The tank 1 is disposed in the box-like structure 2 which constitutes the support for the spring cushion which includes the springs 3 and the pad 4 supported thereon, said cushion being bodily removable. The springs are hidden from view by the fabric walls 5 and 6 at the sides and front and rear, respectively.

The filler opening 7 of the tank 1 is spaced from the front and side walls of the cushion so that the latter must, ordinarily, be bodily removed from its support to give access to said opening which is bordered by an internally threaded nipple indicated by reference character 7.

The device of my invention includes an externally threaded sleeve 8 having a slightly tapered, smooth bore which is adapted to receive the similarly tapered and smooth-surfaced vertical arm of the elbow 9, the other arm of which receives the threaded inner end of the filler-tube 10. The extreme outer end of the latter is smooth and enters an opening in a washer or plate 11 which is disposed inwardly of a fabric wall of the cushion. A sleeve 12 equipped between its end with an annular flange 13 and which is externally threaded at its outer end to receive the closure cap 14, is slidably fitted into the outer end of the filler tube. The flange 13 and plate or washer 11 are provided with suitable openings to permit them to be suitably bolted or otherwise coupled through the fabric around the opening cut therethrough for the passage of the sleeve 12.

In said washer or plate 11 and in the flange 13 there are provided registering slots (the fabric being similarly slotted) through which there projects the indicating hand 15 for the segmental dial 16. Said dial constitutes a flat flange projecting perpendicularly from the flange 13 bordering a wall of the said slot. The indicating hand 15 constitutes one arm of a T-element 16$^a$ pivotally mounted at the point of juncture of its three arms, at which it is provided with a hub (indicated by said reference character 16$^a$). A set screw or other suitable pivot element 17 mounted on the filler tube 10 passes through said hub 16$^a$. The lateral arms of the T-element are connected by means of the wires 18 and 19 with the float lever 20 on opposite sides of the latter's pivotal connection with the bifurcated lower end of a tube 21 mounted within and projecting below the vertical arm of the elbow 9. It is provided between its ends with slots 22 for the passage of said wires or equivalent elements, the latter passing from the upper end of the tube 21 substantially diametrically of the upper arm of the elbow and inner end of the filler tube 10, into and through the tube 23, the curved inner end of which is suitably fitted into an opening in the top of the filler tube and the body of which extends parallel with the latter to a point contiguous to the pivot element 17. The lever 20 is equipped with the float 24, the length of said lever and the spacing of the connections of the wires 18 and 19 therewith from its pivot being so proportioned to the graduated scale on the dial 16 and the length of the indicating hand, etc., as to cause the latter to accurately indicate on said dial, the gallons-content of the tank 1.

A vent-tube or passage 25 is provided in the elbow for the easy escape of displaced air when filling the tank and for admission of air to replace exhausted gasoline, the opening of said passage into communication with the tank being preferably in the circumferential wall of the vertical arm of the elbow.

The filler tube 10 extends at an incline upwardly from the elbow at an angle which brings the intake end thereof to an elevation sufficiently below the pad of the cushion to avoid interference with the motion of the same against the action of the springs. In some cars it is more convenient and, in fact, necessary that the filler tube extend to the front fabric wall of the spring base of the cushion and in such cases the tube 10 and other parts, such as the wires 18 and 19 and the tube 23, will be shortened as required.

The length of the tube 10 may be such that the cap 14 is disposed practically entirely inwardly of the side edge of the seat-pad as shown, or it may, obviously, be of sufficient length to bring the indicating dial 16 farther outwardly.

The operation and steps necessary to installation of the device will be readily understood without further detailed description.

It will be observed that the sleeve 12 and collar or washer 11 may be removed from the tube 10 to permit the seat cushion to be removed from its support and that this may be accomplished without detaching the said sleeve and collar from the fabric wall.

I claim as my invention:—

1. Mean for the purpose specified including a spring cushion open at the bottom and having flexible fabric walls surrounding the springs thereof, there being free spaces between said springs, a filler-tube for a tank disposed beneath said cushion projecting through and secured to one of said fabric walls of said cushion, and co-operative means for detachably associating the tube with respect to the tank to thereby permit the cushion and tube to be removed without detaching said tube from said cushion, said last-named means permitting rotation of the tube relatively to said tank for permitting said tube to be attached to any desired vertical wall of said cushion.

2. Means for the purpose specified including a spring cushion open at the bottom and having flexible fabric walls surrounding the springs thereof, there being free spaces between said springs, a filler-tube for a tank disposed beneath said cushion projecting through and secured to one of said fabric walls of said cushion, substantially midway between the upper and lower edges thereof and extending at a downward incline toward said tank to thereby permit partial collapse of said cushion without interference by said tube, and co-operative means for detachably associating the tube with respect to the tank to thereby permit the cushion and tube to be removed without detaching said tube from said cushion, said last-named means permitting rotation of said tube relatively to said tank for permitting said tube to be attached to any desired vertical wall of said cushion.

3. A tank-filling attachment of the kind specified including a cushion having a fabric wall, a filler tube, means for connecting the same at one end with the filler opening of a tank, an annularly flanged filler-cap sleeve slidably mounted in the other end of said tube, a collar or washer normally loosely associated with said sleeve and said tube, and coupling means for securing said annular flange of said sleeve and the said collar upon opposite faces of the fabric wall, there being an opening in the latter for the passage of said sleeve, the latter removable from said tube without detachment from said fabric wall to permit removal of the cushion.

WILLIAM FRIEDHOFF.